(12) United States Patent
Watanabe et al.

(10) Patent No.: US 9,720,608 B2
(45) Date of Patent: Aug. 1, 2017

(54) STORAGE SYSTEM

(71) Applicant: Hitachi, Ltd., Tokyo (JP)

(72) Inventors: Yasuo Watanabe, Tokyo (JP); Norio Shimozono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/762,955

(22) PCT Filed: Nov. 7, 2013

(86) PCT No.: PCT/JP2013/080100
§ 371 (c)(1),
(2) Date: Jul. 23, 2015

(87) PCT Pub. No.: WO2015/068233
PCT Pub. Date: May 14, 2015

(65) Prior Publication Data
US 2015/0363129 A1   Dec. 17, 2015

(51) Int. Cl.
*G06F 3/06* (2006.01)

(52) U.S. Cl.
CPC .......... *G06F 3/0619* (2013.01); *G06F 3/0608* (2013.01); *G06F 3/0641* (2013.01); *G06F 3/0665* (2013.01); *G06F 3/0689* (2013.01)

(58) Field of Classification Search
CPC ........ G06F 3/06; G06F 3/0689; G06F 3/0655; G06F 3/0619; G06F 3/0665; G06F 3/0641; G06F 3/0608
See application file for complete search history.

(56) References Cited

U.S. PATENT DOCUMENTS

| 8,245,007 B2 | 8/2012 | Ohira et al. |
| 2002/0013889 A1* | 1/2002 | Schuster ............ G06F 12/1072 711/203 |
| 2009/0313248 A1 | 12/2009 | Balachandran et al. |
| 2012/0163082 A1* | 6/2012 | Confalonieri .......... G11C 16/16 365/185.11 |
| 2013/0212074 A1 | 8/2013 | Romanski et al. |

FOREIGN PATENT DOCUMENTS

| JP | 2013-514558 A | 4/2013 |
| WO | 2013/157103 A1 | 10/2013 |
| WO | 2013/051129 A1 | 11/2013 |

OTHER PUBLICATIONS

International Search Report of PCT/JP2013/080100.

\* cited by examiner

*Primary Examiner* — Hiep Nguyen
(74) *Attorney, Agent, or Firm* — Mattingly & Malur, PC

(57) ABSTRACT

A storage control apparatus performs, for each virtual area to which a physical area is allocated, any one of coarse-grained management for managing a correspondence relationship between a virtual area and a physical area in a first size unit, and fine-grained management for managing a correspondence relationship between a virtual area and a physical area in a second size unit smaller than the first size unit. The storage control apparatus manages mapping information that expresses a correspondence relationship between a virtual area and a physical area. The storage control apparatus performs at least one of change of any of fine-grained virtual areas to a coarse-grained virtual area and change of any of coarse-grained virtual areas to a fine-grained virtual area, based on the number of duplication areas of each virtual area and a size of the mapping information.

13 Claims, 16 Drawing Sheets

Fig.4
┌╌╌┐ Virtual chunk    ☐ Physical chunk
(1a) Before deduplication
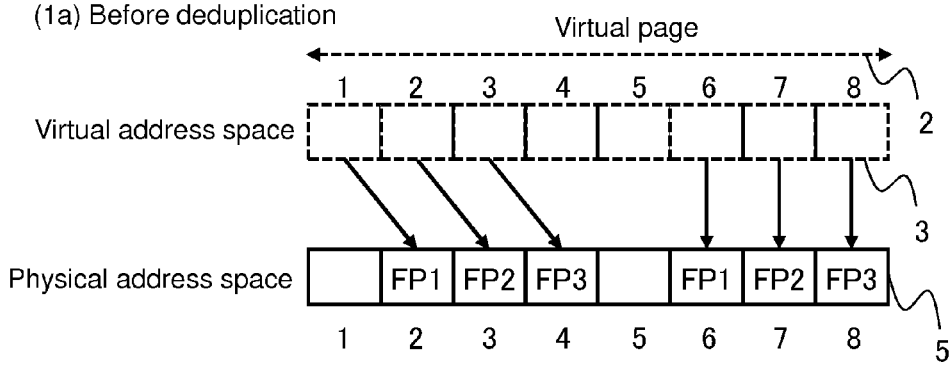
(1b) After deduplication
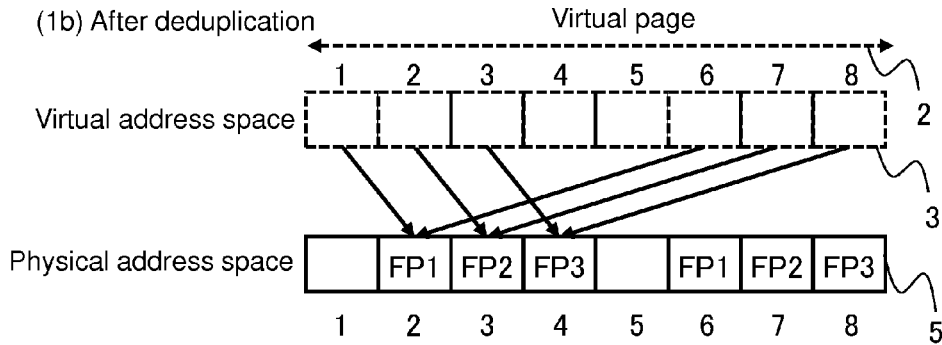
(2a) Virtual-physical mapping using individual chunk mapping
| Virtual address of virtual chunk | Physical address of physical chunk |
|---|---|
| 1 | 2 |
| 2 | 3 |
| 3 | 4 |
| : | : |
| 6 | 2 |
| 7 | 3 |
| 8 | 4 |
(2b) Virtual-physical mapping using Extent
| Virtual address of virtual chunk | Physical address of physical chunk | Length |
|---|---|---|
| 1 | 2 | 3 |
| 6 | 2 | 3 |

Fig.5

Virtual volume management table 100

| Virtual volume number |
|---|
| #1 |

101

| Virtual page number | State | Physical page number | Extent management table number | Duplication virtual chunk counter |
|---|---|---|---|---|
| 1 | Coarse-grained management | #1 | N/A | |
| 2 | Fine-grained management | N/A | #1 | |
| 3 | Unallocated | N/A | N/A | |
| : | : | : | : | |

Extent management table 110

| Extent management table number | Next table number |
|---|---|
| #1 | N/A |

| Virtual-chunk virtual address | Physical-chunk physical address | Length |
|---|---|---|
| VA1 | PA1 | L1 |
| VA2 | PA2 | L2 |
| 0 | 0 | 0 |
| 0 | 0 | 0 |
| 0 | 0 | 0 |
| 0 | 0 | 0 |
| 0 | 0 | 0 |
| 0 | 0 | 0 |

Physical page management table 200

| Physical page number 201 | State 202 | Real address 203 |
|---|---|---|
| 1 | Unallocated | |
| 2 | Coarse-grained management | |
| 3 | Fine-grained management | |
| : | : | : |

Fig.8

Physical chunk management table — 210

| Physical-chunk physical address (211) | State (212) | Fingerprint (213) | Virtual-chunk virtual address list (214) |
|---|---|---|---|
| 1 | Fine-grained management and allocated | FP1 | 1 |
| 2 | Fine-grained management and allocated | FP1 | 2 |
| 3 | Fine-grained management and allocated | FP2 | 3,4 |
| 4 | Fine-grained management and unallocated | N/A | N/A |
| 4 | Unallocated | N/A | N/A |
| 5 | Coarse-grained management | FP3 | N/A |
| : | : | : | : |

Fig.9

Free-physical chunk management table — 220

| Start physical address (221) | Length (222) |
|---|---|
| 1 | 3 |
| : | : |

Fig.10

Threshold value management table

| Item | Value |
|---|---|
| First threshold value | 100TB |
| Second threshold value | 110TB |

STORAGE SYSTEM

TECHNICAL FIELD

The present invention generally relates to deduplication of data in a storage system.

BACKGROUND ART

As techniques for efficiently utilizing a disc capacity of a storage apparatus, there are known a virtual volume technique and a deduplication technique (see PTL1, for example). The deduplication technique includes a technique of performing deduplication to all data stored in a storage subsystem, and a technique of performing deduplication to only specific pattern data registered in advance, and the latter is disclosed in PTL1. Further, in PTL1, there is disclosed a technique of suppressing a data volume of mapping information (virtual-physical mapping information) as management information utilized by the virtual volume technique and the deduplication technique.

In PTL1, the storage subsystem has a virtual volume, and a physical volume having a physical area allocated to the virtual volume. By dividing an address space of the virtual volume into a plurality of pages, the storage subsystem manages each of the plurality of pages by classifying the page into one state out of a plurality of states including at least a first state and a second state. Further, the storage subsystem manages a page classified into the second state, by further dividing the page into a plurality of segments. The first state is a state that, as a result of a write request received in a page, a physical area is allocated to the page, and data is stored in the physical area. The second state is a state that, as a result of a write request received in a segment in a page for writing write data that matches specific pattern data determined in advance, the specific pattern data and the segment are related to each other and managed.

CITATION LIST

Patent Literature

[PTL1]
U.S. Pat. No. 8,245,007

SUMMARY OF INVENTION

Technical Problem

However, according to the techniques disclosed in PTL1, it is not possible to perform control that takes into account a capacity limit of a storage device which stores virtual-physical mapping information. Further, there are cases that the capacity of the storage device becomes in short and that an unnecessary vacant capacity occurs in the storage device, with a result that the capacity of the storage device cannot be effectively utilized. Therefore, it is an object to control a data volume of mapping information to an optimum value, and improve the number of deduplication in a storage system as much as possible.

Solution to Problem

In order to achieve the above object, there is provided a storage system that includes a plurality of physical storage devices which become a basis of a pool as a physical storage area, and a storage control apparatus that is coupled to the plurality of physical storage devices, provides a virtual volume as a virtual logical volume to a host computer, allocates a physical area from the pool to a virtual area to which a write destination of the virtual volume belongs, and writes data of a write target to the allocated physical area. The storage control apparatus performs, for each virtual area to which a physical area is allocated, anyone of coarse-grained management for managing a correspondence relationship between a virtual area and a physical area in a first size unit, and fine-grained management for managing a correspondence relationship between a virtual area and a physical area in a second size unit smaller than the first size unit. The storage control apparatus manages mapping information that expresses a correspondence relationship between a virtual area and a physical area. The storage control apparatus performs at least one of change of any of fine-grained virtual areas to a coarse-grained virtual area and change of any of coarse-grained virtual areas to a fine-grained virtual area, based on the number of duplication areas of each virtual area and a size of the mapping information. The duplication area of the virtual area is an area which exists in a physical area allocated to the virtual area and stores duplicated data. The coarse-grained virtual area is a virtual area for which the coarse-grained management is performed, and the fine-grained virtual area is a virtual area for which the fine-grained management is performed.

It is possible to control a data volume of mapping information to an optimum value, and improve the number of deduplication in a storage system as much as possible.

BRIEF DESCRIPTION OF DRAWINGS

FIG. 4 is a conceptual diagram of a virtual-physical mapping concerning a virtual page of which state is "fine-grained management".

FIG. 5 is a diagram showing a configuration example of a virtual volume management table.

FIG. 6 is a diagram showing a configuration example of an Extent management table.

FIG. 7 is a diagram showing a configuration example of a physical page management table.

FIG. 8 is a diagram showing a configuration example of a physical chunk management table.

FIG. 9 is a diagram showing a configuration example of an free-physical chunk management table.

FIG. 10 is a diagram showing a configuration example of a threshold value management table.

DESCRIPTION OF EMBODIMENTS

An embodiment is described in detail below with reference to the drawings. In all drawings for describing the embodiment, identical reference symbols are attached to identical elements in principle, and their repeated description is omitted. When a program or a function becomes a subject in the description, actually, a processor or a circuit that executes the program executes the processing. In the following description, a physical storage device is also referred to as a "PDEV (Physical Device)" in some cases. The PDEV is a nonvolatile storage device such as an HDD (Hard Disk Drive) and an SSD (Solid State Drive) as representative examples.

A computer system according to the embodiment is described with reference to FIG. 1 to FIG. 16.

Figure 1:
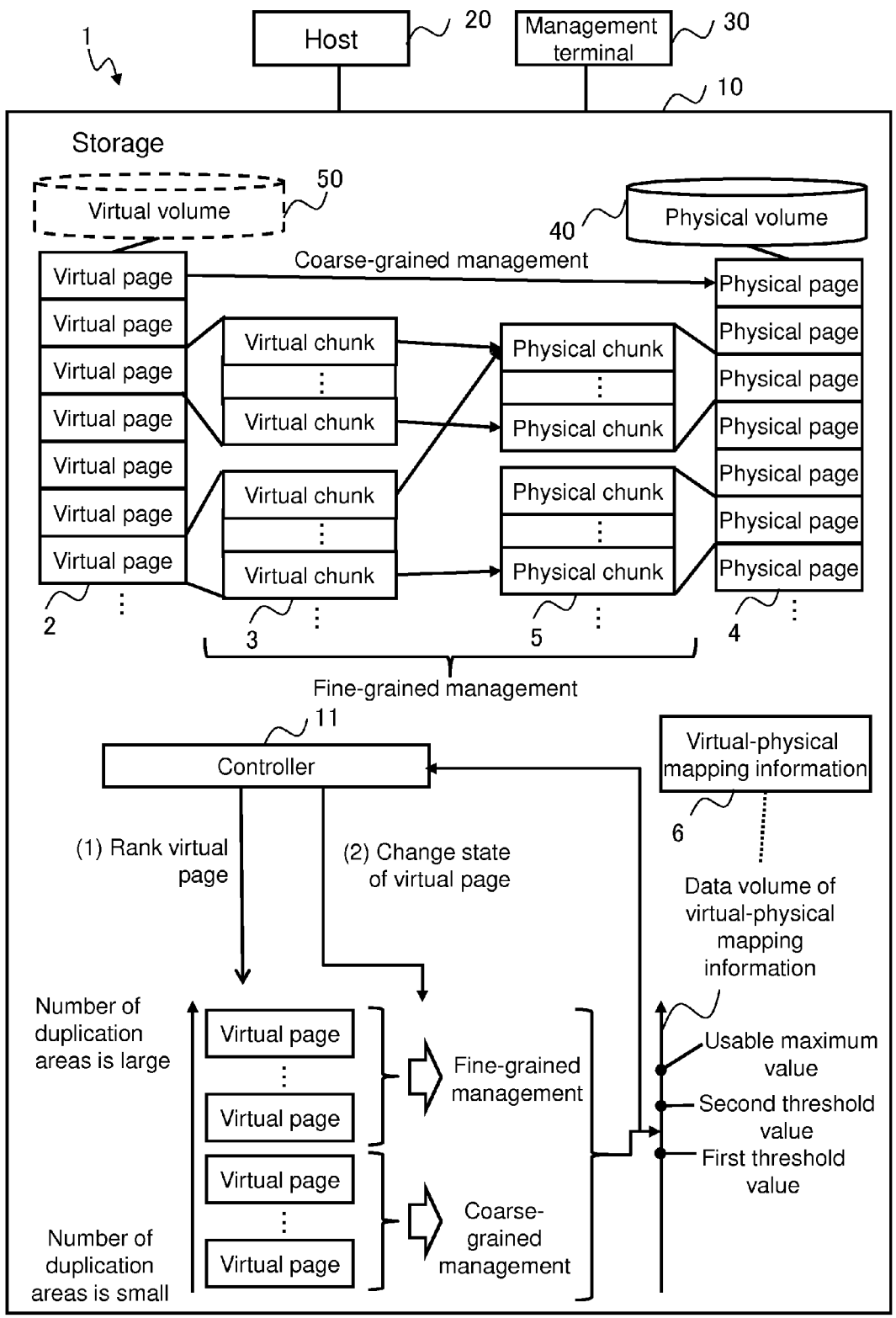
FIG. 1 is a diagram showing a configuration example of a computer system according to an embodiment.

FIG. 1 is a diagram showing an outline of the present embodiment. A virtual volume 50 that a storage system (hereinafter, storage) 10 supplies to a host 20 is configured by a plurality of virtual pages 2. Each virtual page 2 is configured by a plurality of virtual chunks 3. A physical volume 40 that stores real data of the virtual volume 50 is configured by a plurality of physical pages 4. Each physical page 4 is configured by a plurality of physical chunks 5. When a state of the virtual page 2 is coarse-grained management, mapping in a page unit is performed (that is, the virtual page 2 is directly mapped in the physical page 4). When a state of the virtual page 2 is fine-grained management, mapping in a chunk unit is performed (that is, the virtual chunk 3 that constitutes the virtual page 2 is mapped in the physical chunk 5). Information for managing mapping is stored in virtual-physical mapping information 6. The virtual-physical mapping information 6 corresponds to a virtual volume management table 100, an Extent management table 110, a physical page management table 200, and a physical chunk management table 210. A volume of data for managing mapping of the virtual page 2 of which state is coarse-grained management is small, but a volume of data for managing mapping of the virtual page 2 of which state is fine-grained management is large. Deduplication is applied to the virtual page 2 of which state is fine-grained management, but deduplication is not applied to the virtual page 2 of which state is coarse-grained management. The virtual page 2 to which coarse-grained management is performed is an example of a coarse-grained virtual area, and the virtual page 2 to which fine-grained management is performed is an example of a fine-grained virtual area.

A controller 11 ranks virtual pages 2 according to the number of duplication areas (or expected value of the number of duplication areas) for each virtual page 2. The controller 11 changes the state of the virtual page 2 so that a data volume of the virtual-physical mapping information 6 becomes a proper value. The controller 11 controls such that the virtual page 2 of a large number of duplication areas is applied with fine-grained management, and the virtual page 2 of a small number of duplication areas is applied with coarse-grained management. For determination of whether the data volume of the virtual-physical mapping information 6 is a proper value, a threshold value can be utilized. For the threshold value, one or a plurality of threshold values (a first threshold value, and a second threshold value, for example) can be utilized. A threshold value may be automatically set based on a capacity of a device (also referred to as a meta data storage device) that stores the virtual-physical mapping information 6, or may be set by a manager.

By the present embodiment, the virtual page 2 of a small number of duplication areas is applied with coarse-grained management and is not applied with deduplication, and the virtual page 2 of a large number of duplication areas is applied with fine-grained management and deduplication is applied. Therefore, it becomes possible to achieve both setting the data volume of the virtual-physical mapping information 6 to a proper value, and maximum improving the number of duplication areas as a total of the storage apparatus. As a result, in a state that the capacity of the meta data storage device is limited, the capacity of a storage medium necessary for user data storage can be maximum deleted, and cost of the meta data storage device and cost of storage medium for user data storage can be optimized. In this way, cost of the storage apparatus that is utilized for shared-file storage and analysis-system data storage can be reduced. In an on-premises environment, enterprises can build a storage system at low cost. In a cloud environment, cloud vendors can provide a storage area to users at low cost, and the users can utilize cloud services at low cost.

Figure 2:
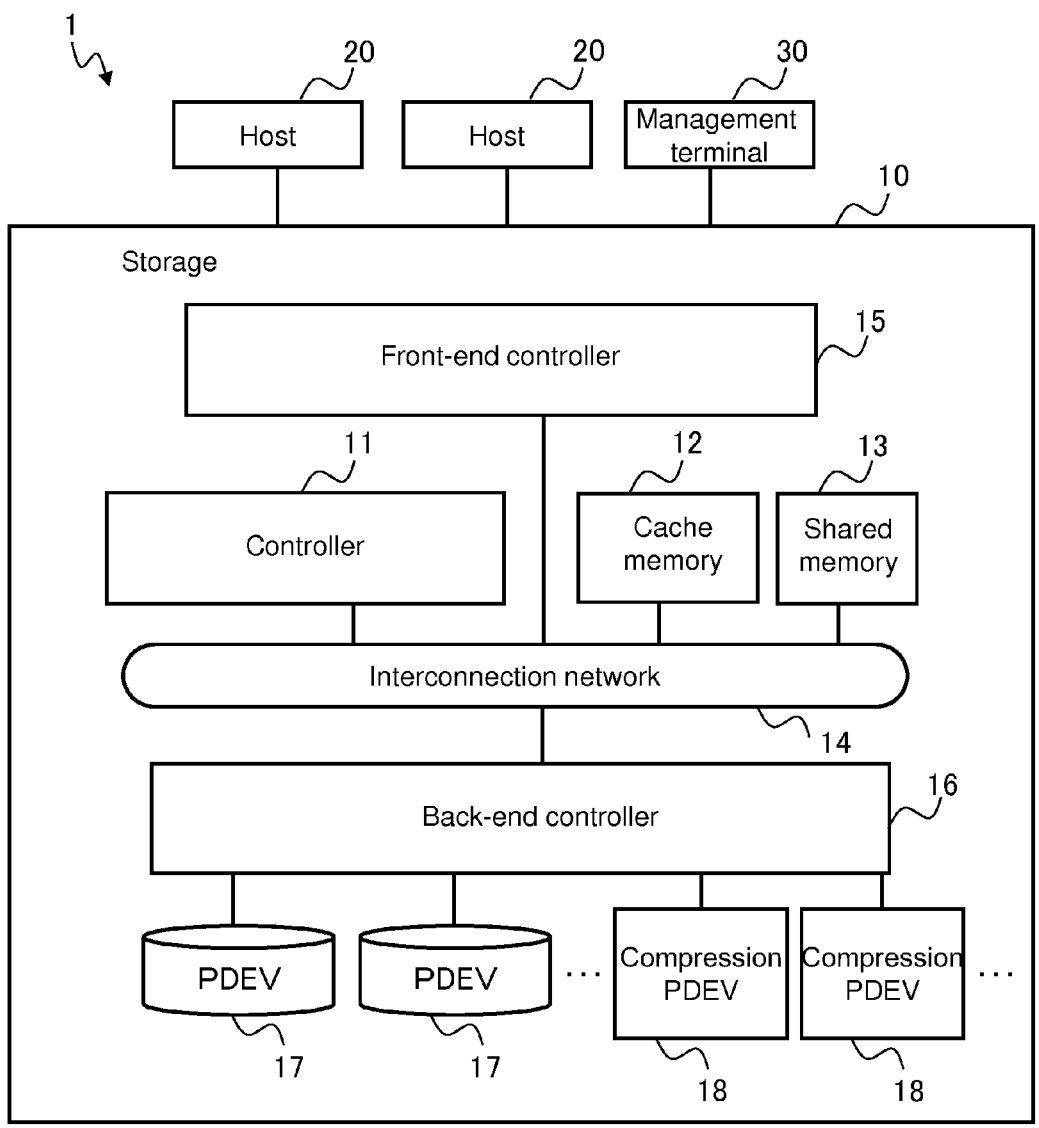
FIG. 2 is a diagram showing a configuration example of a hardware configuration of the computer system.

FIG. 2 is a diagram showing a configuration example of a hardware configuration of a computer system 1.

The computer system 1 is configured by a storage 10, hosts 20, and a management terminal 30. The hosts 20 and the storage 10 are coupled to each other via a SAN (Storage Area Network), for example, and exchange data, processing requests, and the like via the network. The management terminal 30 and the storage 10 are coupled to each other via a LAN (Local Area Network), for example, and exchange data, processing requests, and the like via the network.

First, the hosts 20 are described.

The hosts 20 are any computers (a PC, a server, a main frame computer, for example) that the users use. Each host 20 includes a CPU, a memory, a PDEV, a user interface, a LAN interface, and a communication interface, for example. An internal bus connects between various components in the host 20. In a disk, there are stored programs such as application programs of various driver software and a database management system (DBMS). After these programs are read to the memory, the programs are read and executed by the CPU. The application programs perform read and write accesses to a virtual volume supplied by the storage 10.

Next, the management terminal 30 is described.

The management terminal 30 has a hardware configuration similar to that of the host 20. A management program is stored in a PDEV of the management terminal 300. After the management program is read to the memory, the management programs is read and executed by the CPU. By the management program, the manager can refer to various states of the storage 10 and can perform various setting of the storage 10.

Next, a hardware configuration of the storage 10 is described.

The storage 10 is configured by the controller 11, a cache memory 12, a shared memory 13, an interconnection network 14, a front-end controller 15, aback-end controller 16, a PDEV 17, and a compression PDEV 18. The controller 11, the front-end controller 15, and the back-end controller 16 correspond to a storage control apparatus.

The cache memory 12 is a storage area for temporarily storing data received from the host 20 or from other storage, and temporarily storing data read from the PDEV 17. The cache memory 12 is configured by using volatile memories such as a DRAM and an SRAM, or by using nonvolatile memories such as a NAND flash memory, an MRAM, a ReRAM, and a PRAM. The cache memory 12 may be incorporated in the controller 11.

The shared memory 13 is a storage area for storing management information relevant to various data processings in the storage 10. The shared memory 13 can be configured by using various volatile memories and nonvolatile memories in a similar manner to that of the cache memory 12. As a hardware of the shared memory 13, a hardware that is common to the cache memory 12 can be used, and a hardware that is not common to the cache memory 12 can be used. The shared memory 13 may be incorporated in the controller 11.

The controller 11 is a component that performs processing of various data in the storage 10. For example, the controller 11 stores data received from the host 20 or other storage into the cache memory 12, writes data stored in the cache memory 12 into the PDEV 17, reads data stored in the PDEV 17 into the cache memory 12, and transmits data in the cache memory 12 to the host 20 or other storage. The controller 11 is configured by a local memory, a CPU, an internal bus, and an internal port that are not shown. The local memory of the controller 11 can be configured by using various volatile memories and nonvolatile memories in a similar manner to that of the cache memory 12. The local memory, the CPU, and the internal port of the controller 11 are coupled to each other via the internal bus of the controller 11. The controller 11 is coupled to the interconnection network 14 via the internal port of the controller 11.

The interconnection network 14 is a component for connecting between components, and transferring control information and data between the mutually coupled components. The interconnection network 14 can be configured by using a switch and a bus, for example.

The front-end controller 15 is a component that performs a relay of control information and data exchanged between the host 20 or other storage and the cache memory 12 or the controller. The front-end controller 15 is configured by a buffer, a host port, a CPU, an internal bus, and an internal port that are not shown. The buffer is a storage area for temporarily storing control information and data relayed by the front-end controller 15, and is configured by using various volatile memories and nonvolatile memories in a similar manner to that of the cache memory 12. The internal bus mutually connects various components in the front-end controller 15. The front-end controller 15 is coupled to the host 20 via the host port, and is also coupled to the interconnection network 14 via the internal port.

The back-end controller 16 is a component that performs a relay of control information and data that is exchanged between the PDEV 17 or the compression PDEV 18 and the controller 11 or the cache memory 12. The back-end controller 16 can be configured by a buffer, CPU, an internal bus, and an internal port not shown. The buffer is a storage area for temporarily storing control information and data relayed by the back-end controller 16, and can be configured by using various volatile memories and nonvolatile memories in a similar manner to that of the cache memory 12. The internal bus mutually connects various components in the back-end controller 16. The back-end controller 16 is coupled to the interconnection network 14, the PDEV 17, and the compression PDEV 18 via the internal port.

The PDEV 17 is a storage area for storing data used by an application program on the host 20, and management information relevant to various data processings in the storage 10.

The compression PDEV 18 is a PDEV having a compression function, and is a storage area for storing data used by an application program on the host 20, and management information relevant to various data processings in the storage 10, in a similar manner to that of the PDEV 17. The compression function of the compression PDEV 18 may be realized by a purpose-built hardware that executes compression and expansion or by a CPU. The purpose-built hardware may be configured to perform any one of compression and expansion, and the CPU may be configured to perform the other of compression and expansion.

In the present embodiment, each of the PDEV 17 and the compression PDEV 18 is provided by one or more, and a total capacity of the one or more PDEV 17 and the one or more compression PDEV 18 is 64 PB, for example.

Figure 3:
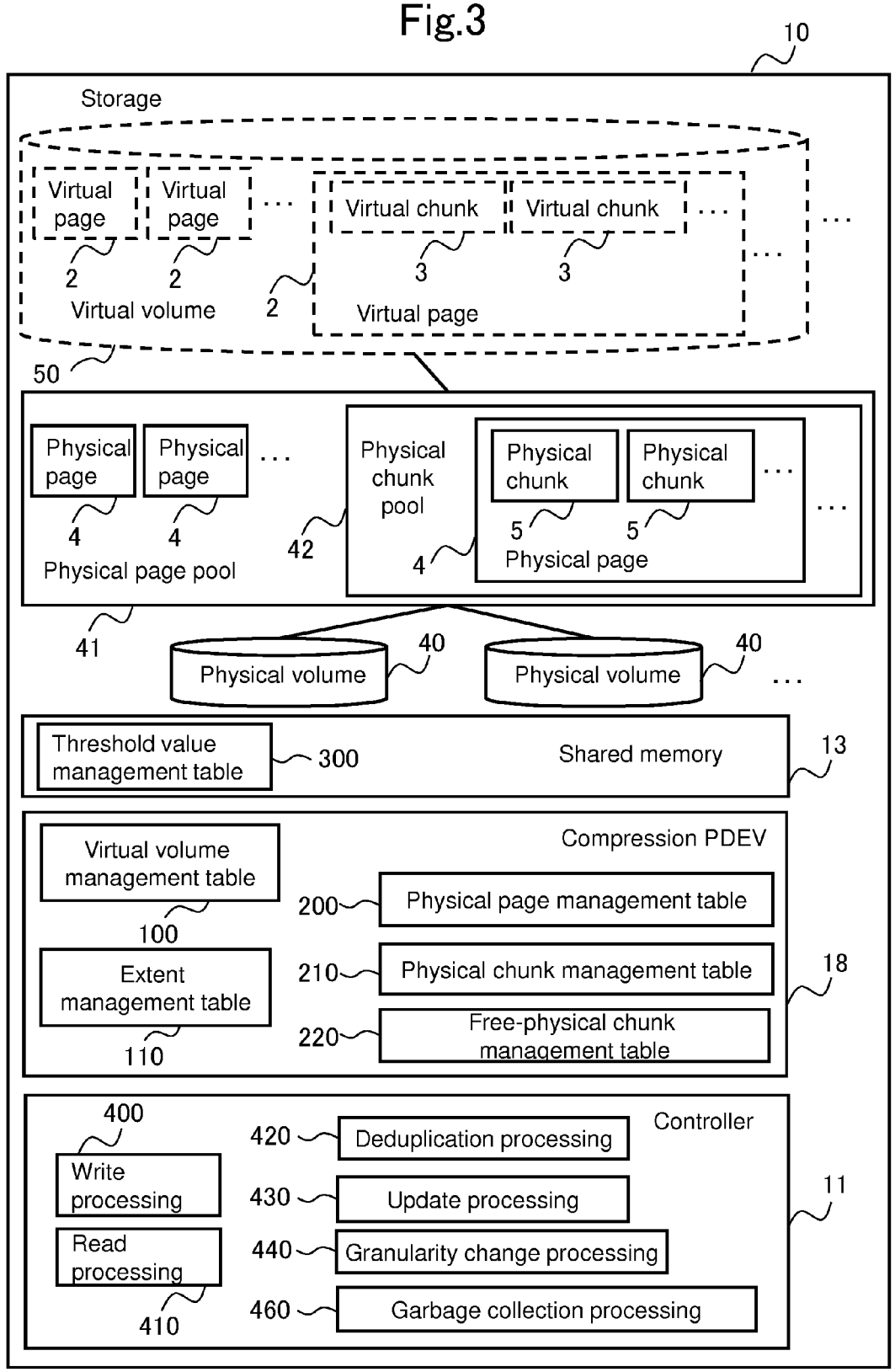
FIG. 3 is a diagram showing a configuration example of a logical configuration of a storage.

FIG. 3 is a diagram showing a configuration example of a logical configuration of the storage 10.

The physical volume 40 is a storage area for storing data used by an application program on the host 20, and management information relevant to various data processings in the storage 10. A storage area of the physical volume is configured based on a RAID (Redundant Arrays of Inexpensive (Independent) Disks) technique or a technique belonging to this, by using a storage area of the PDEV 17 and the compression PDEV 18. That is, the physical volume 40 is a storage area based on a RAID group, and the RAID group may be configured by a plurality of PDEV 17 or a plurality of compression PDEV 18. The PDEV 17 and the compression PDEV 18 may coexist in one RAID group.

The physical volume 40 is managed by being divided into a plurality of physical pages 4 as a fixed-length portion storage area. For example, a size of the physical page 4 is 42 MB. Further, the physical page 4 is managed by being divided into a plurality of physical chunks 5 as a fixed-length portion storage area. For example, a size of the physical chunk 5 is 4 KB.

The physical pages 4 are pooled in a physical page pool 41. States of the physical pages 4 are managed by state 202 (FIG. 7) of a physical page management table 200 described later. For the states of the physical pages 4, there are three states of "unallocated", "coarse-grained management", and "fine-grained management". A physical page 4 of which state is "unallocated" is not mapped in any one of the virtual pages 2 and the virtual chunks 3. A physical page 4 of which state is "coarse-grained management" is directly mapped in a certain virtual page 2. The physical chunk 5 of a physical page 4, of which state is "fine-grained management", is mapped in a certain virtual chunk 3.

When a state of the physical page 4 is "fine-grained management", the physical chunk 5 in the physical page 4 is pooled in a physical chunk pool 42. Out of the physical chunks 5 in the physical chunk pool 42, the physical chunk 5 in a free state is managed by a free-physical chunk management table 220 (FIG. 9) described later.

The virtual volume 50 is a virtual storage area (virtual logical volume) provided to the host 20.

The virtual volume 50 is divided into a plurality of virtual pages 2 as a fixed-length portion storage area. The virtual page 2 is managed by being divided into a plurality of virtual chunks 3 as a fixed-length portion storage area.

A size of the virtual page 2 and a size of the physical page 4 are the same, and a size of the virtual chunk 3 and a size of the physical chunk 5 are the same.

A virtual-physical mapping state of a storage area in the virtual page 2 and the physical volume 40 becomes one of (1) a state that nothing is mapped in the virtual page 2, (2) a state that the physical page 4 is directly mapped in the virtual page 2, and (3) a state that the physical page 4 is not directly mapped in the virtual page 2, but the physical chunk 5 is mapped in the virtual chunk 3 in the virtual page 2. As described with reference to FIG. 1, in the case of the mapping state of (2), the state of the virtual page 2 is "coarse-grained management", and in the case of the mapping state of (3), the state of the virtual page 2 is "fine-grained management". In the case of the mapping state of (1), the state of the virtual page 2 is "unallocated".

In the case of the mapping state of (2), the virtual chunk 3 in the virtual page 2 can be regarded to be indirectly mapped in the physical chunk 5 in the physical page 4.

While the virtual chunk 3 and the physical chunk 5 can be individually mapped, the virtual chunk 3 and the physical chunk 5 can be also mapped by using a data structure referred to as Extent described later.

In the storage 10, various tables relevant to a data processing are stored.

In the shared memory 13, a threshold value management table 300 is stored. The threshold value management table 300 can be also configured to be stored in the PDEV 17 and the compression PDEV 18.

In the compression PDEV 18, there are stored tables including a virtual volume management table 100, an Extent management table 110, a physical page management table 200, a physical chunk management table 210, a free-physical chunk management table 220. As described above, the virtual volume management table 100, the Extent management table 110, the physical page management table 200, and the physical chunk management table 210 correspond to the virtual-physical mapping information 6, and their capacity is 0.2% of a total capacity (64 PB, for example) of the PDEV 17 and the compression PDEV 18, for example. Therefore, the virtual-physical mapping information 6 becomes dozens of TB, and is difficult to be stored in the cache memory 12.

These tables can be configured to be stored in the shared memory 13 and the PDEV 17.

These tables may be stored without compression in the shared memory 13, the PDEV 17, or the compression PDEV 18, or may be stored by compression in the shared memory 13, the PDEV 17, or the compression PDEV 18. By compression, a necessary capacity to store these tables can be saved, and cost of the storage 10 can be reduced.

These tables may be stored in a tiered memory that is configured by a plurality of the shared memory 13, the PDEV 17, and the compression PDEV 18. In the tiered memory, information of high access frequency is stored in a higher-speed and expensive memory, and information of low access frequency is stored in a lower-speed and inexpensive memory. With this arrangement, access performance and cost of the storage 10 can be optimized.

Details of various tables stored in the storage 10 are described later.

Various programs relevant to a data processing are stored in the controller 11 of the storage 10. The various programs include write processing 400, read processing 410, deduplication processing 420, update processing 430, granularity change processing 440, and garbage collection processing 460. Processing flows of the various programs are described later.

FIG. 4 is a conceptual diagram of a virtual-physical mapping concerning the virtual page 2 of which state is "fine-grained management".

FIG. 4(1a) and FIG. 4(1b) are explanatory diagrams of updating of the virtual-physical mapping.

In FIG. 4 (1a) and FIG. 4 (1b), a virtual address space and a physical address space are address spaces that are provided by the virtual volume 50 and the physical volume 40, respectively. By a virtual address and a physical address, it is possible to uniquely specify the virtual chunk 3 and the physical chunk 5 in the storage 10, respectively. In the present example, addresses "1" to "8" are provided to the virtual address space and the physical address space, respectively. Eight virtual chunks 3 are included in one virtual page 2, and each virtual chunk 3 corresponds to the addresses "1" to "8".

In FIG. 4, "FP" is an abbreviation of a Fingerprint, and the Fingerprint is an intrinsic value calculated based on data stored in the physical chunk 5. For calculating Fingerprint, there can be used a hash value calculation method such as SHA-1 (Secure Hash Algorithm). For example, a length of a hash value calculated by SHA-1 is as long as 160 bits. Because a probability that two data of which respective Fingerprints match each other completely match each other is very high, it is also possible to easily determine whether the two data completely match each other depending on whether Fingerprints match each other. There is also a case that although Fingerprints of two data match each other, the data do not completely match each other. Therefore, by comparing the two data bit-by-bit, it is also possible to determine whether the two data completely match each other. To simplify the explanation, description of a bit-by-bit comparison is omitted in the following description of the present embodiment.

FIG. 4(1a) shows an example of a state before deduplication.

The physical chunks 5 of the addresses "2" an "6" in the physical address space have a common Fingerprint of "FP1". Therefore, deduplication can be performed. Deduplication is similarly applied to the physical chunks 5 that have Fingerprints of "FP2" and "FP3". Concerning the virtual-physical mapping, the virtual chunk 3 of the address "1" of the virtual address space is mapped in the physical chunk 5 of the address "2" of the virtual address space, for example. Other virtual chunks 3 are mapped in the physical chunks 5 of addresses of mutually different physical address spaces.

FIG. 4 (1b) shows an example of a state after deduplication.

In the present example, by deduplication, the virtual-physical mapping concerning the virtual chunks 3 of the addresses "6", "7", and "8" of the virtual address space is changed. For example, the virtual-physical mapping concerning the virtual chunk 3 of the address "6" of the virtual address space is changed so that the virtual chunk 3 is mapped in the physical chunk 5 of the address "2" of the physical address space. In this case, the address "2" of the physical chunk 5 corresponds to duplication areas of the addresses "1" and "6" of the virtual chunk 3. As a result, the physical chunk 5 of the address "6" of the physical address space becomes in a state of not being mapped from any virtual chunk 3, and therefore, the physical chunk 5 can be reutilized to newly store other data. Similarly, the physical chunks 5 of the addresses "7" and "8" of the 5 of the physical address space can be reutilized to newly store other data.

FIGS. 4(2a) and 4(2b) are explanatory diagrams of a data structure that expresses the virtual-physical mapping of the virtual chunk 3 and the physical chunk 5. States of the virtual-physical mapping in FIGS. 4(2a) and 4(2b) respectively correspond to the example of the state of the virtual-physical mapping in FIG. 4(1b).

FIG. 4(2a) is a table utilizing a data structure of the virtual-physical mapping that uses individual chunk mapping. The individual chunk mapping is a mapping management system that records mapping information of the virtual chunk 3 and the physical chunk 5 at one to one, concerning individual virtual chunks 3. In the case of the data structure in FIG. 4(2a), one row of the table is consumed to express the virtual-physical mapping of one virtual chunk 3.

FIG. 4(2b) is a table utilizing a data structure of the virtual-physical mapping that uses Extent. The Extent is a mapping management system that efficiently manages mapping information concerning chunks that are continuous in both the virtual address space and the physical address space. In FIG. 4(2b), a virtual address (start) of the virtual chunk 3, a physical address (start) of the physical chunk 5, and a Length are recorded in one row of the table. In the present example, three virtual chunks 3 (the virtual chunks 3 of the addresses "1", "2", and "3") that are continuous on the virtual address are expressed in one row. When there are many chunks that are continuous in both the virtual address space and the physical address space, the virtual-physical mapping in FIG. 4(2b) can manage the virtual-physical mapping by a storage capacity smaller than that of the virtual-physical mapping in FIG. 4(2a). In the Length, a length (number of virtual chunks) of a virtual chunk (one or a continuous plurality of virtual chunks) in which data is stored is recorded.

Next, configuration examples of various tables in the storage 10 are described.

FIG. 5 is a diagram showing a configuration example of the virtual volume management table 100. Information concerning the virtual volume 50 is recorded in the virtual volume management table 100.

The virtual volume management table 100 is configured by columns of virtual volume number 101, virtual page number 102, state 103, physical page number 104, Extent management table number 105, and duplication virtual chunk counter 106.

In the virtual volume number 101, an identifier for uniquely identifying in the storage 10 the virtual volume 50 in the storage 10 is recorded.

In the virtual page number 102, an identifier for uniquely identifying in the virtual volume 50 the virtual page 2 included in the virtual volume 50 is recorded.

In the state 103, a state of the virtual page 2 is recorded. In the state 103, any one of values of "unallocated", "coarse-grained management", and "fine-grained management" is recorded. Because the meaning of each value is described with reference to FIG. 3, the description is omitted here.

In the physical page number 104, an identifier of the physical page 4 mapped in the virtual page 2 is recorded, when the state 103 of the virtual page 2 is "coarse-grained management". When the state 103 of the virtual page 2 is other than "coarse-grained management", a not-applicable value (N/A) is recorded in the physical page number 104.

In the Extent management table number 105, a number of the Extent management table 110 is recorded, when a state of the virtual page 2 is "fine-grained management". When a state of the virtual page 2 is other than "fine-grained management", a not-applicable value (N/A) is recorded in the Extent management table number 105.

In the duplication virtual chunk counter 106, a number of the virtual chunk 3 as a duplication virtual chunk is recorded, out of virtual chunks included in the virtual page 2. The virtual chunk 3 as a duplication virtual chunk indicates that the physical chunk 5 mapped in one virtual chunk 3 is duplicate with the physical chunk 5 mapped in another virtual chunk 3. However, the physical chunk 5 is the physical chunk 5 that is included in the physical page 4 of which the state 202 described later is "fine-grained management" or "coarse-grained management".

A value of the duplication virtual chunk counter 106 is set by the update processing 430 described later. The value of the duplication virtual chunk counter 106 is used for ranking the virtual page 2 according to the number of duplication areas (or expected value of the number of duplication areas), as described with reference to FIG. 1. A size of the "number of duplication areas" in FIG. 1 can be determined by using a value of the duplication virtual chunk counter 106. That is, the number of duplication areas in this virtual page 2 can be regarded as larger as a value of the duplication virtual chunk counter 106 in a certain virtual page 2 is larger.

The duplication virtual chunk counter 106 of the virtual page 2 of which value of the state 103 is "fine-grained management" corresponds to the number of duplication areas. On the other hand, the duplication virtual chunk counter 106 of the virtual page 2 of which value of the state 103 is "coarse-grained management" corresponds to "expected value" of the number of duplication areas. That the duplication virtual chunk counter 106 corresponds to "expected value" is because deduplication is not executed to the physical chunk 5 that corresponds to the virtual page 2 of which value of the state 103 is "coarse-grained management".

FIG. 6 is a diagram showing a configuration example of the Extent management table 110.

In the Extent management table 110, there is recorded information concerning the virtual-physical mapping of the virtual page 2 of which state is "fine-grained management". As a method of the virtual-physical mapping, the method in FIG. 4(2b) is used.

In the Extent management table 110, there are stored columns of Extent management table number 111, next table number 112, virtual-chunk virtual address 113, physical-chunk physical address 114, and Length 115. The number of rows of a table (referred to as a main table) in which the virtual-chunk virtual address 113 and the like are stored is fixed. FIG. 6 shows an example that the number of rows of the main table is eight. When the number of Extents to be managed exceeds the number of rows of one main table, a large number of Extents can be managed by linking the Extent management tables 110 in a chain shape.

The Extent management tables 110 are dynamically allocated. That is, the Extent management tables 110 are secured by the number to be used, and the size changes dynamically.

In the Extent management table number 111, an identifier of the Extent management table is stored.

In the next table number 112, an identifier of the Extent management table is stored as pointer information in the case of linking the Extent management tables 110 in a chain shape.

In the virtual-chunk virtual address 113, the physical-chunk physical address 114, and the Length 115, there are stored a virtual address (start point) of the virtual chunk 3, a physical address (start point) of the physical chunk 5, and a Length, respectively.

As shown in FIG. 6, valid rows in the main table are stored in top alignment, and "0" may be stored in columns of not-applicable rows in the main table. By storing in this way, many "0" are arranged in the Extent management table 110. Therefore, the Extent management table 110 can be efficiently compressed.

Effective rows in the main table (a plurality of main tables when the Extent management tables 110 are linked in a chain shape) may be sorted by a value of the virtual-chunk virtual address 113, for efficient search.

Unused Extent management tables 110 are managed by a free-table list not shown. To simplify the explanation, description of detailed operations of the free-table list is omitted in the following.

A data structure of the Extent management table 110 may be a balanced-tree such as a B+Tree. In this case, a key of the balanced-tree is a virtual address of a virtual chunk of each Extent. An advantage of using the balanced-tree is that the number of times of accessing a recording medium at reference and update times can be suppressed to a constant or smaller number of times.

In the present embodiment, the virtual-physical mapping using the Extent in FIG. 4 (2b) is employed as a method of the virtual-physical mapping. However, as a method of the virtual-physical mapping, the virtual-physical mapping using the individual chunk mapping in FIG. 4(2a) may be used, in place of the virtual-physical mapping using the Extent in FIG. 4(2b).

FIG. 7 is a diagram showing a configuration example of the physical page management table 200. In the physical page management table 200, information concerning the physical page 4 is recorded.

The physical page management table 200 is configured by physical page number 201, the state 202, and real address 203.

In the physical page number 201, an identifier of the physical page 4 is recorded.

In the state 202, a state of the physical page 4 is recorded. In the state 202, any one of values of "unallocated", "coarse-grained management", and "fine-grained management" is recorded. Because the meaning of each value is described with reference to FIG. 3, the description is omitted here.

In the real address 203, an address of the storage area in the PDEV 17 and the compression PDEV 18 is recorded. Write data written in the physical page 4 is written into the recording area specified by the real address.

FIG. 8 is a diagram showing a configuration example of the physical chunk management table 210. In the physical chunk management table 210, information relevant to the physical chunk 5 in the storage 10 is recorded.

The physical chunk management table 210 is configured by columns of physical-chunk physical address 211, state 212, Fingerprint 213, and virtual-chunk virtual address list 214.

In the physical-chunk physical address 211, an identifier (physical address of a physical address space) of the physical chunk 5 is stored.

In the state 212, a state of the physical chunk 5 is recorded. In the state 212, there is recorded any one of values of "unallocated", "coarse-grained management", an "fine-grained management and allocated", and "fine-grained management and unallocated". When the state 202 of the physical page 4 to which the physical chunk 5 belongs is "unallocated", a value of "unallocated" is recorded in the state 212. When the state 202 of the physical page 4 is "coarse-grained management", a value of "coarse-grained management" is recorded in the state 212. When the state 202 of the physical page 4 is "fine-grained management" and also when the physical chunk 5 is mapped in a certain virtual chunk 3 in the Extent management table 110, a value of "fine-grained management and allocated" is recorded in the state 212. When the state 202 of the physical page 4 is "fine-grained management" and also when the physical chunk 5 is not mapped in any virtual chunk 3 in the Extent management table 110, a value of "fine-grained management and unallocated" is recorded in the state 212.

In the Fingerprint 213, the Fingerprint of the physical chunk 5 is recorded, when a value of the state 212 is "coarse-grained management" or "fine-grained management and allocated". When a value of the state 212 is "unallocated" or "fine-grained management and unallocated", a not-applicable value (N/A) is recorded in the Fingerprint 213.

In the virtual-chunk virtual address list 214, a virtual address list of the virtual chunk 3 that is mapped in the physical chunk 5 is recorded, when a value of the state 212 is "fine-grained management and allocated". When a value of the state 212 is other than "fine-grained management and allocated", a not-applicable value (N/A) is recorded in the virtual-chunk virtual address list 214.

FIG. 9 is a diagram showing a configuration example of the free-physical chunk management table 220. The free-physical chunk management table 220 is information for managing the physical chunk 5 (referred to as a free physical chunk) of which value of the state 212 in the physical chunk management table 210 is "fine-grained management and unallocated". In the free-physical chunk management table 220, continuous free physical chunks are expressed in one row.

The free-physical chunk management table 220 is configured by columns of start physical address 221 and Length 222.

In the start physical address 221, there is recorded a physical address of one free physical chunk, or a header physical address of a continuous plurality of free physical chunks.

In the Length 222, there is recorded a length (number of physical chunks) of a free physical chunk (one or a continuous plurality of free physical chunks).

FIG. 10 is a diagram showing a configuration example of the threshold value management table 300. In the threshold value management table 300, there is stored a threshold value that is used in the granularity change processing 440 described later.

The threshold value management table 300 is configured by columns of item 301 and value 302. In the threshold value management table 300, there are recorded a value of "first threshold value" and "second threshold value". There is a relationship that "first threshold value" is smaller than "second threshold value".

A value of the threshold value managed by the threshold value management table 300 can be configured to be set by the manager via a management screen of a management program not shown in the management terminal 300. Alternatively, a value of the threshold value managed by the threshold value management table 300 can be configured to be automatically set by the controller 11 according to capacities of the shared memory 13, the PDEV 17, and the compression PDEV 18.

Next, processing flows of various programs in the storage 10 are described.

Figure 11:
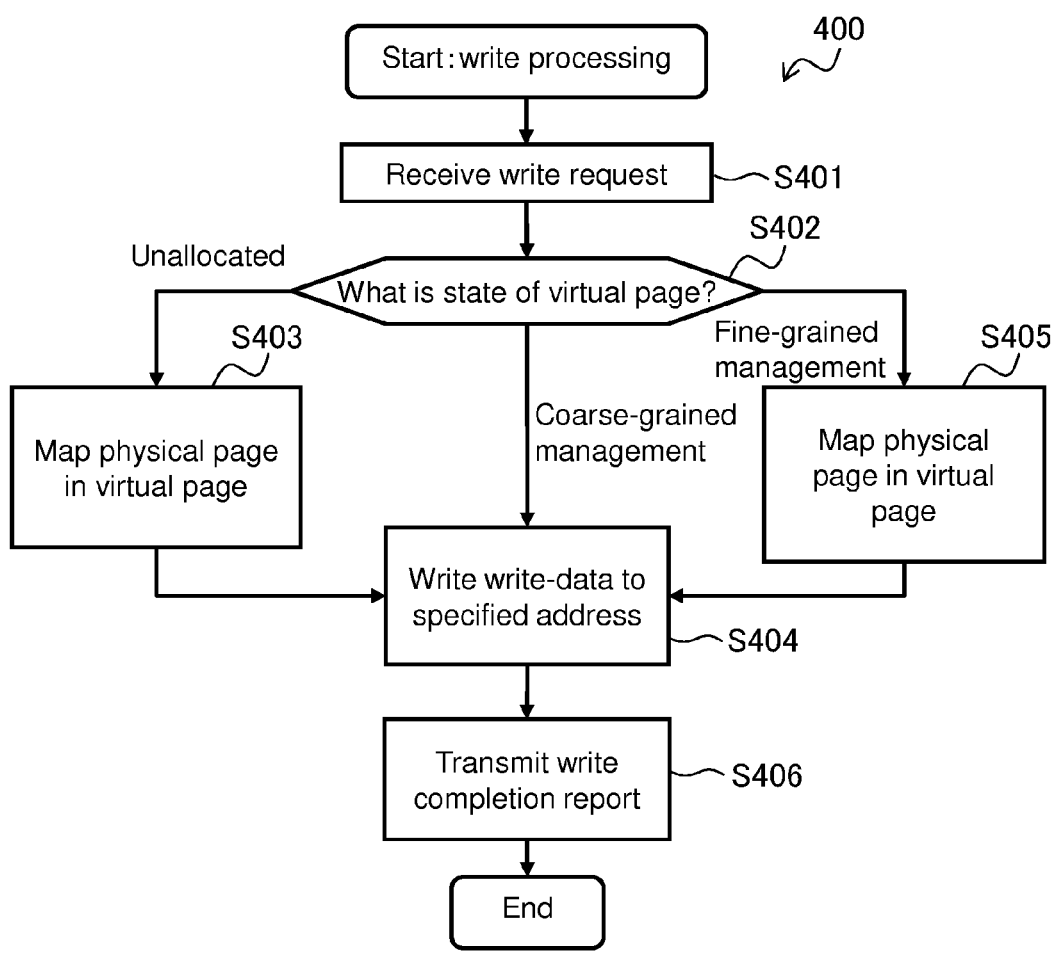
FIG. 11 is a diagram showing an example of a processing flow of a write processing.

FIG. 11 is a diagram showing an example of a processing flow of the write processing 400.

In the write processing 400, the controller 11 writes data into the virtual volume 50, based on a write request from the host 20.

At S401, the controller 11 receives a write request from the host 20.

At S402, the controller 11 refers to the virtual volume management table 100, and determines a value of the state 103 of the virtual page 2 corresponding to the write request. The controller 11 proceeds to S403, S404, or S405, according to a value ("unallocated", "coarse-grained management", or "fine-grained management") of the state 103.

When a value of the state 103 is "unallocated", at S403, the controller 11 maps the physical page 4 of which the state 202 in the physical page management table 200 is "unallocated", in the virtual page 2.

Specifically, first, the controller 11 selects one physical page 4 of which the state 202 is "unallocated" from the physical page management table 200. Next, the controller 11 updates a row of the virtual volume management table 100 corresponding to the virtual page 2, as follows. That is, the controller 11 records the value of "coarse-grained management" into the state 103, records the identifier of the selected physical page 4 into the physical page number 104, sets the not-applicable value to the Extent management table number 105, and records the initial value "0" into the duplication virtual chunk counter 106. Next, the controller 11 writes the value of "coarse-grained management" into the state 202 of the physical page management table 200 corresponding to the selected physical page 4. Next, the controller 11 sets values as follows to the rows of the physical chunk management table 210 corresponding to the physical chunk 5 included in the selected physical page 4. That is, the controller 11 sets the value of "coarse-grained management" to the state 212, and sets the not-applicable value to the virtual-chunk virtual address list 214.

When a value of the state 103 is "coarse-grained management", at S404, the controller 11 writes the write data corresponding to the write request into the physical chunk 5 corresponding to the virtual address specified by the write request. Following the writing of the write data into the physical chunk 5, the controller 11 updates the value of the Fingerprint 213 of the physical chunk 5.

When a value of the state 103 is "fine-grained management", at S405, the controller 11 maps the physical chunk 5 of which the state 212 in the physical chunk management table 210 is "fine-grained management and unallocated" into the virtual chunk 3 corresponding to the write request.

Specifically, first, the controller 11 selects the free physical chunk 5 from the free-physical chunk management table 220. Next, the controller 11 specifies the Extent management table 110 corresponding to the virtual page 2. Next, the controller 11 registers the Extent as follows into the not-applicable row of the specified Extent management table 110. That is, the controller 11 sets the virtual address of the virtual chunk 3 corresponding to the write request to the virtual-chunk virtual address 113, sets the physical address of the physical chunk 5 to the physical-chunk physical address 114, and sets the number of the virtual chunk 3 corresponding to the write request to the Length 115. Depending on the case, a chain of the Extent management table 110 needs to be extended. Next, the controller 11 sets values as follows to the rows of the physical chunk management table 210 corresponding to the physical chunk 5. That is, the controller 11 sets the value of "fine-grained management and allocated" to the state 212, and sets the virtual address of the virtual chunk 3 corresponding to the physical chunk 5 to the virtual-chunk virtual address list 214.

At S406, the controller 11 transmits a write completion report to the host 20.

Figure 12:
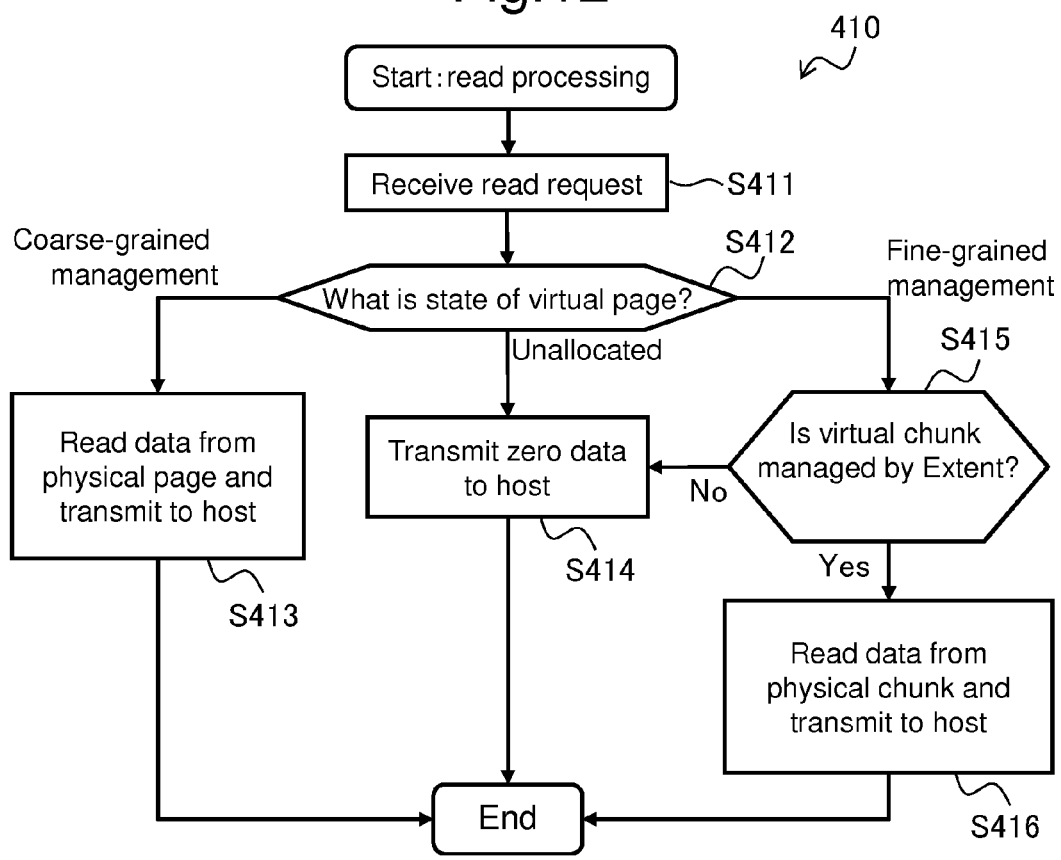
FIG. 12 is a diagram showing an example of a processing flow of a read processing.

FIG. 12 is a diagram showing an example of a processing flow of the read processing 410.

In the read processing 410, the controller 110 transmits data read from the virtual volume 50 to the host 20, based on a read request from the host 20.

At S411, the controller 11 receives a read request from the host 20.

At S412, the controller 11 refers to the virtual volume management table 100, and determines a value of the state 103 of the virtual page 2 corresponding to the read request. The controller 11 proceeds to S413, S414, and S415, according to a value ("coarse-grained management", "unallocated", and "fine-grained management") of the state 103.

When a value of the state 103 is "coarse-granularity management", at S413, the controller 11 reads data necessary for the read request, from the physical page 4 corresponding to the virtual page 2, and transmits the data to the host.

When a value of the state 103 is "unallocated", at S414, the controller 11 generates data (referred to as zero data) of a length specified by the read request, configured by only "0", and transmits the data to the host.

When a value of the state 103 is "fine-grained management", at S415, the controller 11 determines whether the virtual chunk 3 corresponding to the read request is the virtual chunk 3 managed by the Extent. Specifically, the controller 11 refers to the Extent management table 110 corresponding to the virtual page 2, and determines whether the Extent relevant to the virtual chunk 3 corresponding to the read request is registered. The controller 11 proceeds to S416 when a determination result is affirmative, and proceeds to S414 when a determination result is negative.

At S416, the controller 11 reads necessary data from the physical chunk 5 corresponding to the Extent that is determined to be registered at S415, corresponding to the read request, and transmits the data to the host.

Figure 13:
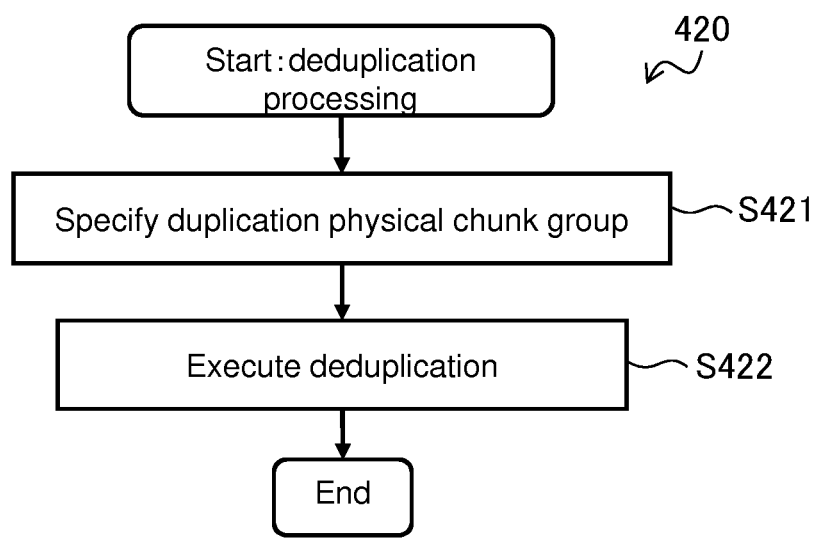
FIG. 13 is a diagram showing an example of a processing flow of a deduplication processing.

FIG. 13 is a diagram showing an example of a processing flow of the deduplication processing 420.

In the deduplication processing 420, the controller 11 performs deduplication to the physical chunk 5 of which value of the state 212 in the physical chunk management table 210 is "fine-grained management and allocated". The deduplication processing 420 can be also configured to be periodically (once a day, for example) automatically started, or can be configured to be manually started by the manager via the management terminal 30.

At S421, the controller 11 specifies a duplication physical chunk group from among the physical chunks 5 of which value of the state 212 is "fine-grained management and allocated". Specifically, the controller 11 specifies the physical chunks 5 of which the value of the Fingerprint 213 is the same from the physical chunks 5 of which the value of the state 212 is "fine-grained management and allocated". The specified group of the physical chunks 5 of which the value in the Fingerprint 213 is the same are referred to as the duplication physical chunk group. As described above, only the group of the physical chunks 5 that completely match each other by the bit-by-bit comparison between the physical chunks 5 may be also regarded as the duplication physical chunk group.

At S422, the controller 11 executes deduplication to a specified duplication physical chunk group (duplication physical chunk group). Specifically, the controller 11 performs the processing described with reference to FIGS. 4(1a) and 4(1b). In this case, according to the deduplication processing, it is necessary to suitably update the virtual-physical mapping information and the physical-virtual mapping information that are mapped by the Extent management table 110 and the physical chunk management table 210 corresponding to the deduplication.

When a plurality of duplication physical chunk groups are found at S421, it is necessary to perform the processing of S422 to each duplication physical chunk group.

Figure 14:
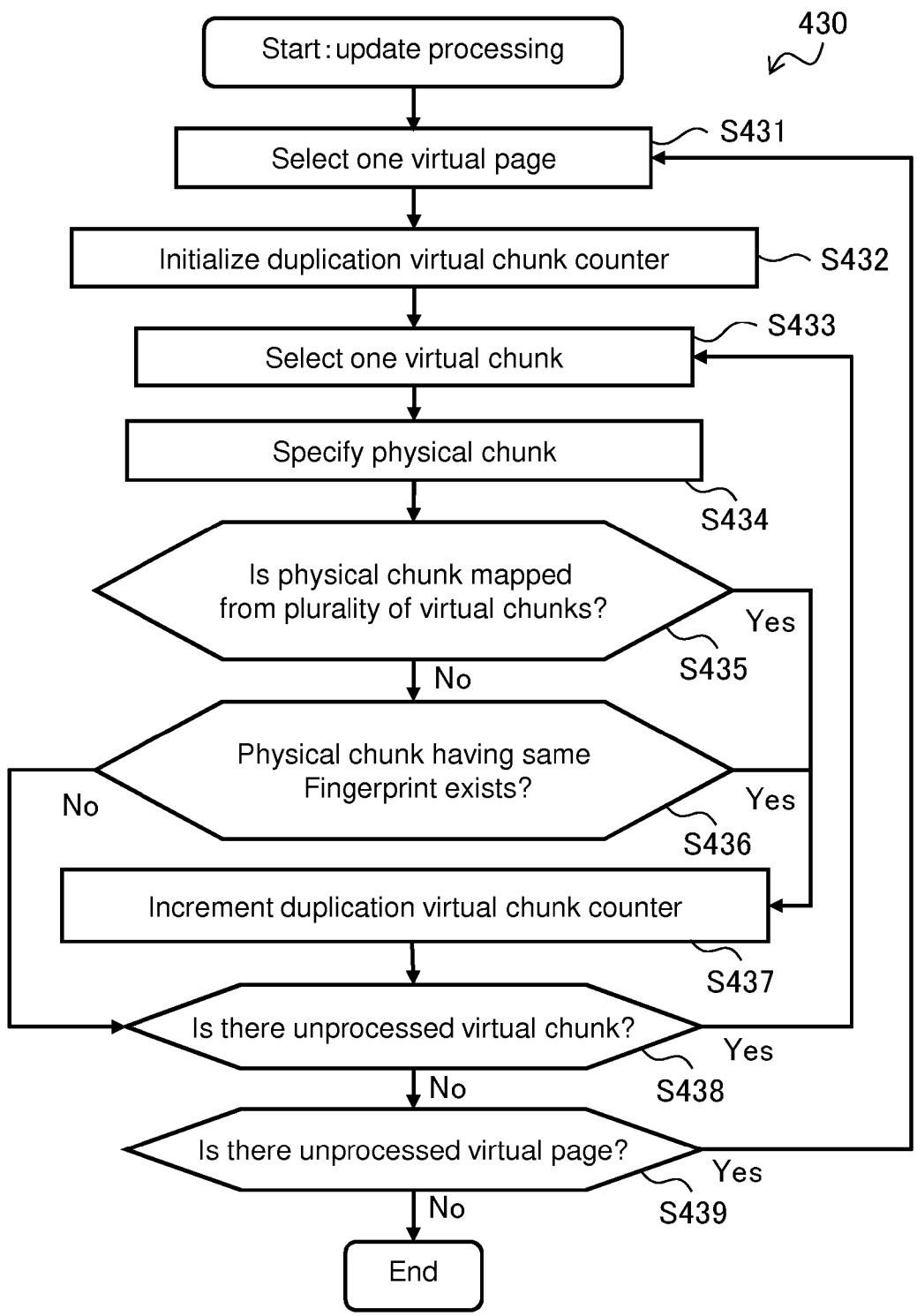
FIG. 14 is a diagram showing an example of a processing flow of an update processing.

FIG. 14 is a diagram showing an example of a processing flow of the update processing 430.

In the update processing 430, a proper value is set in the duplication virtual chunk counter 106 of the virtual volume management table 100. The update processing 430 is executed after executing the deduplication processing 420.

At S431, the controller 11 selects one virtual page 2 from among the virtual pages 2 of which value of the state 103 in the storage 10 is "coarse-grained management" or "fine-grained management".

At S432, the controller 11 initializes a value of the duplication virtual chunk counter 106 corresponding to the selected virtual page 2 by "0".

At S433, the controller 11 selects one virtual chunk 3 from among the virtual chunks 3 that are included in the selected virtual page 2.

At S434, the controller 11 refers to the virtual volume management table 100 and the Extent management table 110, and selects the physical chunk 5 mapped in the selected virtual chunk 3.

At S435, the controller 11 refers to the virtual-chunk virtual address list 214 in the physical chunk management table 210, corresponding to the specified physical chunk 5, and determines whether the physical chunk 5 is mapped from a plurality of virtual chunks 3. The controller 11 proceeds to S437 when a determination result is affirmative, and proceeds to S436 when a determination result is negative.

At S436, the controller 11 refers to the physical chunk management table 210, and determines whether the physical chunk 5 having the Fingerprint that is the same as the Fingerprint of the physical chunk 5 exists. The controller 11 proceeds to S437 when a determination result is affirmative, and proceeds to S438 when a determination result is negative. As described above, the controller 11 may also perform a bit-by-bit comparison between the physical chunks 5 having the same Fingerprint.

At S437, the controller 11 increments by "1" the value of the duplication virtual chunk counter 106 corresponding to the virtual page 2.

At S438, the controller 11 determines whether the virtual chunk 3 that is not yet processed exists. The controller 11 proceeds to S433 when a determination result is affirmative, and proceeds to S439 when a determination result is negative.

At S439, the controller 11 determines whether the virtual page 2 that is not yet processed exists. The controller 11 proceeds to S431 when a determination result is affirmative, and end the processing when a determination result is negative.

A value of the duplication virtual chunk counter 106 is acquired by the update processing 430. This value corresponds to the number of duplication areas.

Figure 15:
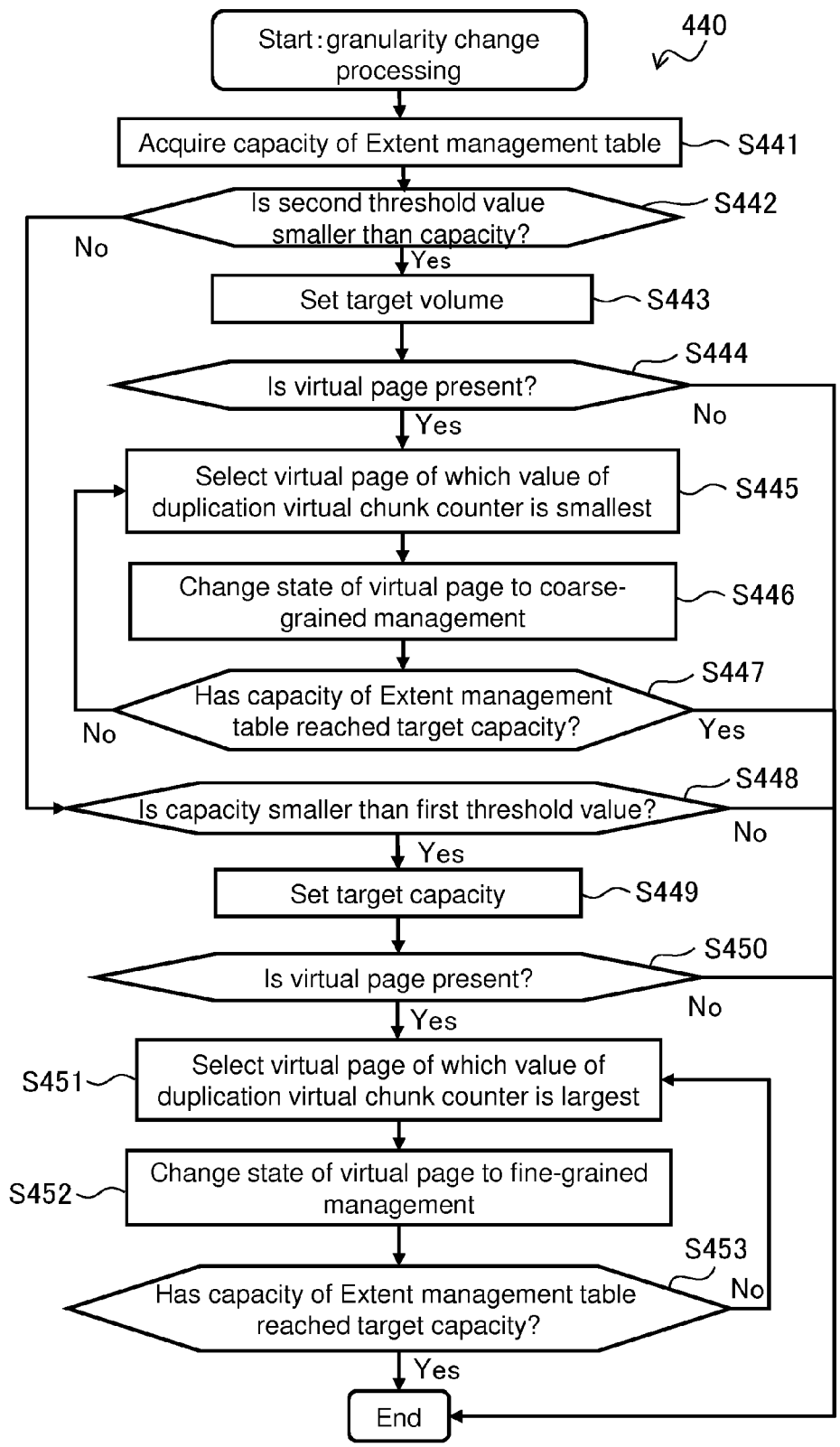
FIG. 15 is a diagram showing an example of a processing flow of a granularity change processing.

FIG. 15 is a diagram showing an example of a processing flow of the granularity change processing 440.

In the granularity change processing 440, the state 103 of the virtual page 2 is changed from "fine-grained management" to "coarse-grained management" or from "coarse-grained management" to "fine-grained management", according to a value of the duplication virtual chunk counter 106 of the virtual page 2, so that the storage capacity consumed by the Extent management table 110 becomes a proper value.

The granularity change processing 440 is started after executing the update processing 430.

At S441, the controller 11 acquires a capacity of the Extent management table 110. When the Extent management table 110 is compressed, the controller 11 acquires a capacity after compression of the Extent management table 110.

At S442, the controller 11 determines whether an acquired capacity is larger than the second threshold value of the threshold value management table 300. The controller 11 proceeds to S443 when a determination result is affirmative, and the controller 11 proceeds to S447 when a determination result is negative.

At S443, the controller 11 sets a target capacity. The target capacity may be a value between the first threshold value and the second threshold value of the threshold value management table 300. For example, the target value is an intermediate value between the first threshold value and the second threshold value.

At S444, the controller 11 determines whether the virtual page 2 of which the state 103 is "fine-grained management" exists. The controller 11 ends the granularity change processing 440 when the virtual page 2 of which the state 103 is "fine-grained management" does not exist (S444: No). On the other hand, when the virtual page 2 of which the state 103 is "fine-grained management" exists, the controller 11 proceeds to S445 (S444: Yes).

At S445, the controller 11 selects the virtual page 2 of which the value of the duplication virtual chunk counter 106 is the smallest out of the virtual pages 2 of which the state 103 of the virtual page 2 is "fine-grained management".

At S446, the controller 11 secures the physical page 4, copies the data of the physical chunks 5 of all Extents included in the selected virtual page 2, into the secured physical page 4, and changes the state 103 of the selected virtual page 2 to "coarse-grained management".

Specifically, first, the controller 11 selects the physical page 4 of which the state 202 is "unallocated" from the physical page management table 200.

Next, the controller 11 copies the data of all the virtual chunks 3 of all the Extents included in the Extent management table 110 corresponding to the selected virtual page 2, to a corresponding position of the secured physical page 4.

Next, the controller 11 updates each table of the virtual volume management table 100, the Extent management table 110, the physical page management table 200, the physical chunk management table 210, and the free-physical chunk management table 220, as follows. That is, the controller 11 changes the state 103 of the selected virtual page 2 to "coarse-grained management", and sets the not-applicable value (N/A) to the Extent management table number 105 of the selected virtual page 2. Further, the controller 11 sets the not-applicable value to the main table of the Extent management table 110, and registers the Extent management table 110 to the free table list not shown. The controller 11 sets "coarse-grained management" into the state 202 of the secured physical page 4. Further, the controller 11 sets (1) the Fingerprint of the physical chunk 5, (2) "coarse-grained management", and (3) the not-applicable value, into (1) the Fingerprint 213, (2) the state 212, and (3) the virtual-chunk virtual address list 214 in the physical chunk management table 210, respectively corresponding to the physical chunk 5 in the selected physical page 4. Further, the controller 11 registers all the physical chunks 5 corresponding to the virtual page 2 at the time point of S444, to the free-physical chunk management table 220.

As a result, the capacity of the storage area consumed by the Extent management table 110 reduces. Capacities of the virtual volume management table 100, the physical page management table 200, and the physical chunk management table 210 do not reduce.

At S447, the controller 11 acquires a capacity of the storage area consumed by the Extent management table 110, and determines whether the acquired capacity has reached a target capacity (that is, whether the acquired capacity is smaller than the target capacity). The controller 11 ends the granularity change processing 440 when a determination result is affirmative, and proceeds to S445 when a determination result is negative. In the case of compressing the Extent management table 110, the capacity after the compression is used.

At S448, the controller 11 determines whether the capacity of the Extent management table 110 is smaller than the first threshold value in the threshold value management table 300. The controller 11 proceeds to S448 when a determination result is affirmative, and the controller 11 ends the granularity change processing 440 when a determination result is negative.

At S449, the controller 11 sets a target capacity in a similar manner to that at S443.

At S450, the controller 11 determines whether the virtual page 2 of which the state 103 is "coarse-grained management" exists. When the virtual page 2 of which the state 103 is "coarse-grained management" does not exist (S450: No), the controller 11 ends the granularity change processing 440. On the other hand, when the virtual page 2 of which the state 103 is "fine-grained management" exists (S450: Yes), the controller 11 proceeds to S451.

At S451, the controller 11 selects the virtual page 2 of which the value of the duplication virtual chunk counter 106 is the largest out of the virtual pages 2 of which the state 103 of the virtual page 2 is "coarse-grained management".

At S452, the controller 11 changes the state 202 of the physical page 4 corresponding to the selected virtual page 2 to "fine-grained management", and changes the state 103 of the selected virtual page 2 to "fine-grained management".

Further, at S452, the controller 11 updates each table of the Extent management table 110, the virtual volume management table 100, and the physical chunk management table 210 as follows.

That is, the controller 11 selects the Extent management table 110 that is not used, and records information concerning the virtual-physical mapping of the selected virtual page 2 into the selected Extent management table 110. In this case, (1) a virtual address of the virtual chunk 3 of the selected virtual page 2, (2) a physical address of the physical chunk 5 of the physical page 4, and (3) the Length of the virtual chunk 3 are set to (1) the virtual-chunk virtual address 113, (2) the physical-chunk physical address 114, and (3) the Length, respectively.

Further, the controller 11 sets (1) the fine-granularity management, (2) the not-applicable value (N/A), and (3) the Extent management table number 111 of the Extent management table into (1) the state 103, (2) the physical page number 104, and (3) the Extent management table number 105, respectively of the virtual volume management table 100 of the virtual page 2.

Further, the controller 11 sets (1) the not-applicable value (N/A), (2) "fine-grained management and allocated", and (3) a virtual address of the virtual chunk 3 corresponding to the physical chunk 5 into (1) the Fingerprint 212, (2) the state 213, and (3) the virtual-chunk virtual address list 214, respectively of the physical chunk management table 210 concerning the physical chunk 5 of the physical page 4.

The controller 11 sets the state 202 of the physical page management table 200 to the fine-grained management.

At S453, the controller 11 acquires a capacity of the storage area consumed by the Extent management table 110, and determines whether the acquired capacity has reached a target capacity (that is, whether the acquired capacity exceeds the target capacity). The controller 11 ends the granularity change processing 440 when a determination result is affirmative, and proceeds to S451 when a determination result is negative. In the case of compressing the Extent management table 110, the capacity after the compression is used.

In the granularity change processing 440, the two threshold values (the first threshold value and the second threshold value) are used. However, it may be set such that by using only one threshold value (a third threshold value), a capacity of the storage area consumed by the Extent management table 110 comes near the one threshold value, for example. The "near" can be defined as between "the third threshold value minus alpha" and "the third threshold value plus alpha", where the alpha is a positive value, for example (In this case, "the third threshold value minus alpha" and "the third threshold value plus alpha" correspond to "the first threshold value" and "the second threshold value", respectively.).

Figure 16:
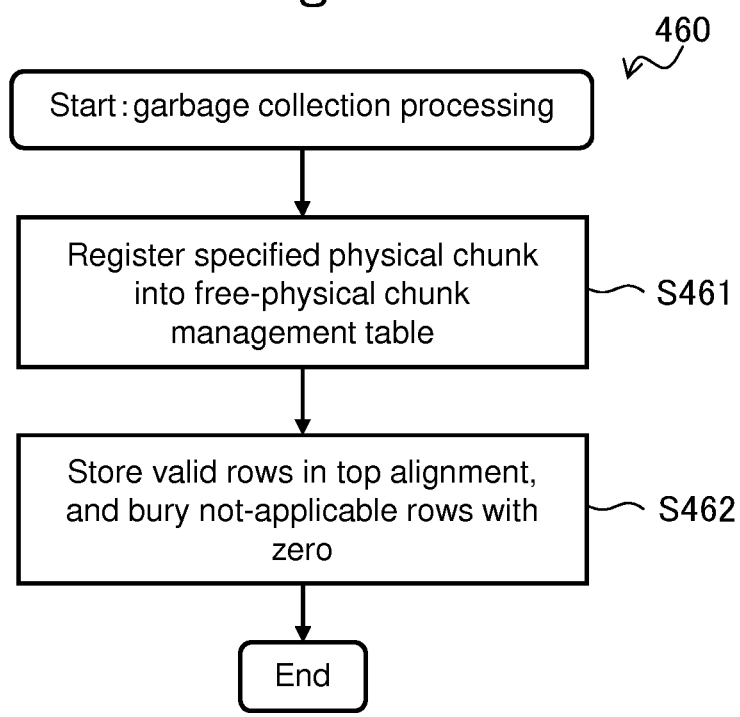
FIG. 16 is a diagram showing an example of a processing flow of a garbage collection processing.

FIG. 16 is a diagram showing an example of a processing flow of the garbage collection processing 460.

The garbage collection processing 460 may be periodically (once a day, for example) automatically started, or can be manually started by the manager via the management terminal 30.

At S461, the controller 11 refers to the virtual-chunk virtual address list 214 in the physical chunk management table 210, specifies the physical chunk 5 (physical chunk 5 in the garbage state) that is not mapped from any virtual chunk 3, and registers the specified physical chunk 5 into the free-physical chunk management table 220. By performing such a processing, the physical chunk 5 can be reutilized.

At S462, the controller 11 restores valid rows in each Extent management table 110, in top alignment, and sets "0" to non-applicable rows. By performing such a processing, many "0" are arranged in the Extent management table 110. Therefore, the Extent management table 110 can be efficiently compressed.

The above embodiment is described in detail to facilitate understanding of the present invention, and all the described configurations are not necessarily limited to be included. Apart of a configuration of a certain embodiment can be replaced with a configuration of other embodiment. A configuration of other embodiment can be added to a configuration of a certain embodiment. Other configuration can be added to, deleted from, or replaced with a part of a configuration of each embodiment.

For example, apart or a whole of the above configurations, functions, processing units, processing means, and the like may be designed by an integrated circuit, and realized by hardware. Alternatively, the above configurations, functions, and the like may be realized by software so that the processor interprets and executes programs that realize respective functions.

In the above embodiment, there is described an example of managing the virtual page 2 by two levels of coarse-grained management and fine-grained management. However, the virtual page 2 can be also configured to be managed by granularity of three or more levels (for example, by three levels of coarse-grained management, intermediate-grained management, and fine-grained management). In the case of managing the virtual page 2 by three levels, for example, the virtual page 2 is managed as one of "coarse-grained management", "intermediate-grained management", and "fine-grained management", according to the number of duplication areas in FIG. 1.

In the above embodiment, there is described a technique of changing the management granularity (coarse-grained management and fine-grained management) of the virtual page 2, according to the number of duplication areas for each virtual page 2. However, the management granularity of the virtual page 2 may be changed, according to a value based on the number of duplication areas for each virtual page 2, for example, a deduplication rate.

REFERENCE SIGNS LIST

1: Storage system, 2: Virtual page, 3: Virtual chunk, 4: Physical page, 5: Physical chunk, 6: Virtual-physical mapping information, 10: Storage, 11: Controller, 15: Front-end controller, 16: Back-end controller, 17: PDEV, 18: Compression PDEV, 20: Host, 40: Physical volume, 41: Physical page pool, 50: Virtual volume, 110: Extent management table

The invention claimed is:

1. A storage system comprising:
a plurality of physical storage devices which become a basis of a pool as a physical storage area; and
a storage control apparatus that is coupled to the plurality of physical storage devices, and is configured to provide a virtual volume as a virtual logical volume to a host computer, to allocate a physical area from the pool to a virtual area to which a write destination of the virtual volume belongs, and to write data of a write target to the allocated physical area, wherein
the storage control apparatus performs, for each virtual area to which a physical area is allocated, one of coarse-granularity management for managing a correspondence relationship between a virtual area and a physical area in a first size unit, and fine-granularity management for managing a correspondence relationship between a virtual area and a physical area in a second size unit smaller than the first size unit,
the storage control apparatus is configured to manage mapping information that expresses a correspondence relationship between a virtual area and a physical area,
the storage control apparatus is configured to perform at least one of change of fine-granularity virtual area to coarse-granularity virtual area, and change of coarse-granularity virtual area to fine-granularity virtual area, based on the number of duplication areas of each virtual area,
the duplication area of the virtual area is an area where data that are present in a physical area allocated to the virtual area and are duplicated are stored,
the coarse-granularity virtual area is a virtual area for which the coarse-granularity management is performed, and the fine-granularity area is a virtual area for which the fine-granularity management is performed.

2. The storage system according to claim 1, wherein the storage control apparatus is configured to increase the number of the fine-grained virtual areas when the size of the mapping information is smaller than a first threshold value.

3. The storage system according to claim 2, wherein the storage control apparatus is configured to change sequentially the coarse-grained virtual areas to the fine-grained virtual areas from a coarse-grained virtual area in which the number of duplication areas is larger, until the size of the mapping information becomes equal to or larger than the first threshold value.

4. The storage system according to claim 2, wherein the storage control apparatus is configured to increase the number of the coarse-grained virtual areas when the size of the mapping information is larger than a second threshold value which is larger than the first threshold value.

5. The storage system according to claim 4, wherein the storage control apparatus is configured to change sequentially the fine-grained virtual areas to the coarse-grained virtual areas from a fine-grained virtual area in which the number of duplication areas is smaller, until the size of the mapping information becomes equal to or smaller than the second threshold value.

6. The storage system according to claim 1, wherein the storage control apparatus is configured to increase the number of the coarse-grained virtual areas when the size of the mapping information is larger than a second threshold value.

7. The storage system according to claim 6, wherein the storage control apparatus is configured to change sequentially the fine-grained virtual areas to the coarse-grained virtual areas from a fine-grained virtual area in which the number of duplication areas is smaller, until the size of the mapping information becomes equal to or smaller than the second threshold value.

8. The storage system according to claim 1, wherein when the physical areas respectively corresponding to a plurality of second size virtual areas store the same data, the storage control apparatus maps the plurality of second size virtual areas into one physical area, out of a plurality of second size physical areas, as the duplication area, and sets remaining physical areas as free areas.

9. The storage system according to claim 1, wherein at least one of the plurality of physical storage devices is a physical storage device having a compression function.

10. The storage system according to claim 9, wherein the mapping information is stored in a compressed state in the physical storage device having the compression function.

11. The storage system according to claim 1, wherein the mapping information is configured by a table that associates a virtual address of a start point of the virtual area in which data is stored, a physical address of a start point of the physical area corresponding to the virtual area in which the data is stored, and a length of the data.

12. The storage system according to claim 11, wherein in the table, valid rows are stored in top alignment, and not-applicable rows are set as zero.

13. A control method of a storage system for allocating a physical area from a pool configured by a plurality of physical areas to a virtual area to which a write destination of a virtual volume as a virtual logical volume configured by a plurality of virtual areas belongs, the control method comprising:
performing, for each virtual area to which a physical area is allocated, one of coarse-grained management for managing a correspondence relationship between a virtual area and a physical area in a first size unit, and fine-grained management for managing a correspondence relationship between a virtual area and a physical area in a second size unit smaller than the first size unit; and
performing at least one of change of fine-granularity virtual area to coarse-granularity virtual area, and change of coarse-granularity virtual area to fine-granularity virtual area, based on the number of duplication areas of each virtual area and a size of mapping information that expresses a correspondence relationship between a virtual area and a physical area, wherein
the duplication area of the virtual area is an area where data that are present in a physical area allocated to the virtual area and are duplicated are stored,
the coarse-granularity virtual area is a virtual area for which the coarse-granularity management is performed, and the fine-granularity virtual area is a virtual area for which the fine-granularity management is performed.

* * * * *